United States Patent [19]

Spencer

[11] 4,095,618
[45] Jun. 20, 1978

[54] RODENT DETERRENT IRRIGATION TUBE

[76] Inventor: Lloyd Spencer, 220 Patrician Way, Pasadena, Calif. 91105

[21] Appl. No.: 729,839

[22] Filed: Oct. 4, 1976

Related U.S. Application Data

[62] Division of Ser. No. 570,382, Apr. 22, 1975, abandoned.

[51] Int. Cl.² .............................................. F16L 11/12
[52] U.S. Cl. .................................. 138/103; 138/118; 138/178; 43/131
[58] Field of Search ........................ 138/103, 118, 178; 61/12, 13; 47/23, 24, 25, 28, 29, 32; 43/131; 424/30; 239/542, 547

[56] References Cited

U.S. PATENT DOCUMENTS

| | | | |
|---|---|---|---|
| 2,750,232 | 6/1956 | Szantay et al. ................... | 138/118 X |
| 2,822,295 | 2/1958 | Barrett et al. ........................ | 424/30 |
| 2,822,296 | 2/1958 | Barrett et al. ........................ | 424/30 |
| 2,935,446 | 5/1960 | Jucaitis ............................... | 424/30 X |
| 3,132,992 | 5/1964 | Kimmel ................................ | 424/30 |
| 3,333,422 | 8/1967 | Neyland ............................. | 239/547 X |
| 3,426,133 | 2/1969 | Shotton ............................. | 424/30 X |
| 3,448,586 | 6/1969 | Mailen et al. ..................... | 47/25 X |
| 3,603,022 | 9/1971 | Asher et al. ....................... | 43/131 |
| 3,643,450 | 2/1972 | Stansbury et al. ................ | 424/30 X |
| 3,774,850 | 11/1973 | Zeman ................................ | 239/542 |
| 3,857,934 | 2/1974 | Berstein et al. .................. | 424/30 |
| 3,864,468 | 2/1975 | Hyman et al. .................... | 42/131 X |

FOREIGN PATENT DOCUMENTS

| | | | |
|---|---|---|---|
| 1,554,136 | 1/1967 | France ............................... | 138/118 |

*Primary Examiner*—Richard E. Aegerter
*Assistant Examiner*—James E. Bryant, III
*Attorney, Agent, or Firm*—Lloyd Spencer

[57] ABSTRACT

An irrigation deterrent tube, particularly adapted for drip or trickle irrigation, the tube having, normally, a flat configuration when free of internal pressure, and expansible to an essentially cylindrical configuration, when pressurized, the tube having laterally projecting webs which tend to be the first to be bitten by a rodent while exploring the presence of the irrigation tube; the lateral margins of the webs may be enlarged to contain a concentration of a deterrent or toxic material. In one embodiment, the tube and webs form a single extrusion, in other embodiments, the tube and webs may be separately extruded and subsequently joined together.

5 Claims, 7 Drawing Figures

RODENT DETERRENT IRRIGATION TUBE

This application is a division of application Ser. No. 570,382, filed Apr. 22, 1975 for IRRIGATION EMITTER TUBE now abandoned.

BACKGROUND

In the field of drip or trickel irrigation, it is a growing practice to use thin wall irrigation tubes which are essentially flat, when free of pressure and which expand to an essentially cylindrical configuration when pressurized.

When flat, such tubing is easily bitten and punctured at its folded side margins by small rodents. In fact the tube even, when pressurized, may be bitten and punctured as the diameter is often in the range between ⅝ and ¾ inches (1.5875 cm and 1.905 cm).

Plastic tubing having relatively thick walls have been impregnated with a deterrent chemical which leaches to the surface of the tube and is tasted by the rodent upon initial contact, before biting and penetrating the tube; however, because of the need to deter the rodent on first contact it is necessary to use a chemical which progressively leaches from the tube.

Extrudable plastics have been formulated which contain a deterrent chemical and have been formed into plastic tubes or pipe. A chemical is selected which tends to leach from the outer surface of the pipe to produce a surface having a repellent taste. Such a chemical also leaches into the pipe and thus is effective for only a limited period. Also, the range of chemicals which may be used is limited as it must be compatable with the plastic material, and cannot be toxic.

SUMMARY

The present invention is directed to a rodent deterrent irrigation tube for drip or trickle irrigation having relatively thin walls, and is summarized in the following objects:

First, to provide a rodent deterrent for irrigation tubes in which laterally extending thin webs are provided, which are readily accessible to a rodent, and, if bitten, the probability of the bite extending to the tube is minimal.

Second, to provide a rodent deterrent for irrigation tubes, as indicated in the previous object, wherein a single extrusion forms the webs and tube.

Third, to provide a rodent deterrent for irrigation tubes, as indicated in the previous objects, wherein the margins of the webs are enlarged to receive a core containing a deterrent chemical which is preferably concentrated and non-leachable, and furthermore may be merely repellent or highly toxic depending upon the environment in which the irrigation tube is used.

Fourth, to provide a rodent deterrent for irrigation tubes, as indicated in the previous objects, wherein the tube and the webs may be separate extrusions joined after the tube is formed.

DETAILED DESCRIPTION

Figure 1:
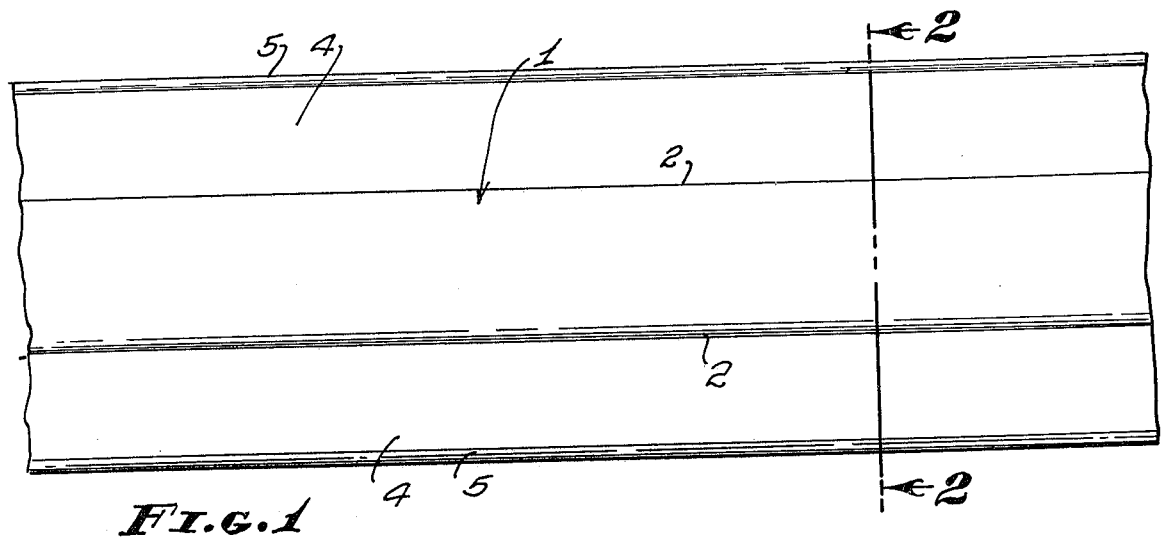
FIG. 1 is a fragmentary plan view showing one embodiment of the rodent deterrent irrigation tube in its normal or flat condition and at approximately full scale, the tube having integral laterally extending webs.
Figure 2:
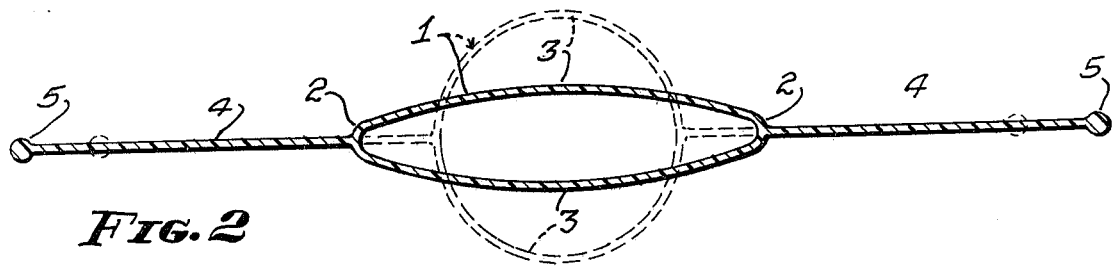
FIG. 2 is an enlarged transverse sectional view thereof, indicating by broken lines the configuration of the tube when pressurized.

Referring to FIGS. 1 and 2, the rodent deterrent irrigation tube here illustrated includes an irrigation tube 1 formed of flexible plastic material commonly used for irrigation tubes. The tube having relatively thin walls which may range in thickness between 0.010 inches and 0.050 inches (0.0254 cm and 0.127 cm) depending upon the intended maximum pressure. An optimum thickness is in the order of 0.030 inches (0.0762 cm).

The tube 1, when free of pressure, has an essentially flat profile including lateral folded margins 2 connected by opposed walls 3 which may be flat or arched as illustrated. Extending laterally from the folded margins 2 are integrally attached webs 4 terminating in marginal beads 5. The width of each web is intended to be greater than the estimated depth of bite made by a rodent.

The tube 1 and webs 4 are extruded as a single unit. The tube 1 may be provided with several types of emitters including the type illustrated in a copending application Ser. No. 783,291. When the tube is in its flat condition, as shown in FIG. 2, the tube itself cannot be grasped between the rodent's teeth. Only the beaded margins are available. Even when the tube is pressurized, the presence of the webs increase the difficulty of making a direct bite into the tube and to this extent deters the rodent.

Figure 3:
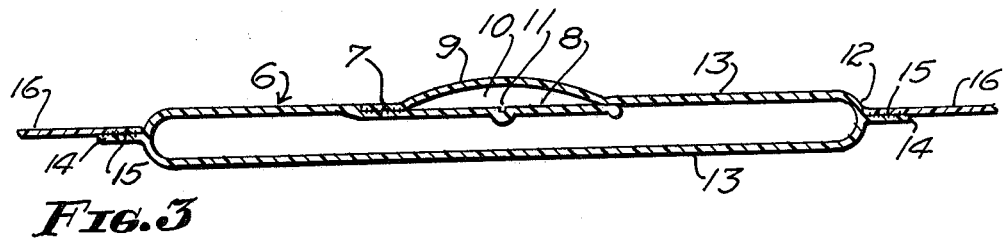
FIG. 3 is a further enlarged fragmentary transverse sectional view corresponding to FIG. 2 showing another embodiment of the rodent deterrent in which the tube and webs are joined after extrusion.

Referring to FIG. 3, the tube 6 here illustrated may be formed from a web of plastic material in the manner disclosed in U.S. Pat. No. 2,491,048. That is, the web is rolled into tubular form to provide circumferentially overlapping zones which are bonded as indicated by 7, as more fully set forth in patent application Ser. No. 729,083. One embodiment shown more fully in said application includes a strip 8 extending circumferentially across an arched zone 9 to form a flush flow passage 10 and drip flow channel 11. As in the first embodiment, the tube 6 includes lateral folded margins 12 and connecting walls 13.

The folded margins 12 are provided with lateral flanges 14 bonded, as indicated by 15, to corresponding webs 16 similar to the webs 4. Operation is the same as the first embodiment.

Figure 4:
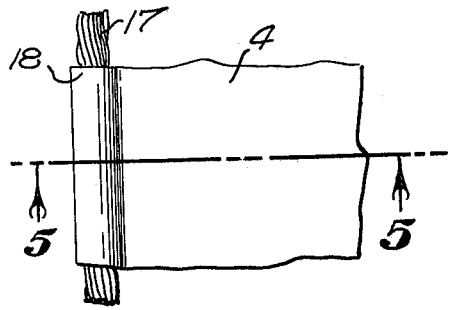
FIG. 4 is an enlarged fragmentary plan view of one of the laterally extending webs having an enlarged margin containing a core of a rodent deterrent.
Figure 5:
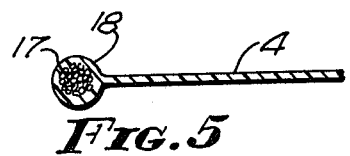
FIG. 5 is a fragmentary sectional view thereof taken through 5—5 of FIG. 4.
Figure 7:
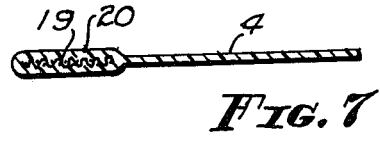
FIG. 7 is a fragmentary sectional view thereof taken through 7—7 of FIG. 6.

Referring to FIGS. 4 and 5, in order to increase the effectiveness of the webs 4 or 16, a fiberous string or cord 17 impregnated with deterrent chemical may be extruded with the web in an encasing wall 18. In this arrangement the deterrent chemical is confined to the margins of the webs and may be selected to have minimal or no leaching effect. Also, because of its remoteness from the tube, a highly toxic chemical may be used. An example of such chemical is strychnine it being recognized that a variety of deterrent chemicals may be used.

Figure 6:
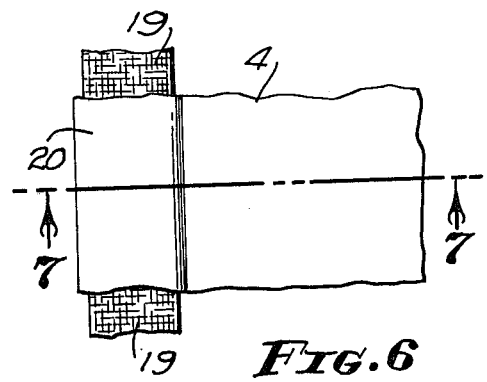
FIG. 6 is an enlarged fragmentary plan view similar to FIG. 4 showing a modified web margin.

Referring to FIG. 6, in place of a cord, a porous fiber strip 19 may be extruded within a relatively flat encasing wall 20.

While for convenience in handling the deterrent chemical a porous fiberous material, such as cotton, may be used, a dried chemical in powdered or granular form may be injected into the plastic material as the enlarged bead is extruded. It is essential that when the bead is severed, loss of chemical from the severed bead occurs for only a limited axial distance in the bead.

Having fully described my invention it is to be understood that I am not to be limited to the details herein set forth, but that my invention is of the full scope of the appended claims.

I claim:

1. A rodent deterrent irrigation tube, comprising:
   a. an essentially flat tube member arranged, when subjected to increasing water pressure to assume an increasingly cylindrical configuration;
   b. and webs extending laterally beyond diametrically opposite margins of the tube member and forming rodent barriers of sufficient width to prevent biting contact across the web into the tube member, the tube member and webs presenting essentially flat surfaces further deterring biting contact with the tube member; and
   c. a rodent deterrent is disposed within and confined to the remote margins of the webs.
2. An irrigation tube as defined in claim 1, wherein:
   a. the tube member and webs are integral.
3. An irrigation tube as defined in claim 1, wherein:
   a. the lateral margins of the tube have integral laterally extending bonding strips;
   b. and the webs are bonded thereto.
4. An irrigation tube as defined in claim 1, wherein:
   a. the rodent deterrent is impregnated in fiberous material encased in the remote margins of the webs.
5. An irrigation tube as defined in claim 1, wherein:
   a. the remote margins of the webs are enlarged and receive a rodent deterrent impregnated fiberous material.

* * * * *